United States Patent [19]

Smith

[11] 4,332,057
[45] Jun. 1, 1982

[54] APPARATUS FOR MECHANICALLY EXTRACTING FISH ROE

[76] Inventor: Charles M. Smith, Box 957, Cordova, Ak. 99574

[21] Appl. No.: 161,372

[22] Filed: Jun. 20, 1980

[51] Int. Cl.³ .............................................. A22C 25/00
[52] U.S. Cl. ...................................................... 17/55
[58] Field of Search .............................. 17/58, 53, 55

[56] References Cited

U.S. PATENT DOCUMENTS

| | | | |
|---|---|---|---|
| 1,116,082 | 11/1914 | Lamoreaux | 17/58 |
| 1,138,300 | 5/1915 | Letin et al. | 17/58 X |
| 1,217,809 | 2/1917 | Nicholson | 17/58 |
| 3,925,846 | 12/1975 | Leander | 17/58 X |

FOREIGN PATENT DOCUMENTS

| | | | |
|---|---|---|---|
| 156511 | 5/1954 | Australia | 17/58 |
| 2060237 | 6/1972 | Fed. Rep. of Germany | 17/58 |
| 586888 | 1/1978 | U.S.S.R. | 17/55 |

Primary Examiner—Willie G. Abercrombie
Attorney, Agent, or Firm—Malin & Haley

[57] ABSTRACT

An apparatus for mechanically extracting fish roe utilized in conjunction with a continuous operation to butcher and clean fish, especially salmon. After head removal, each fish traverses along a V-shaped trough, tail first and belly up, through side compressing (but resilient) rollers, vertically disposed, forcing the roe sack out of the fish body through the opening provided by the head removal. The trough has a lower opening strategically located relative to the rollers to allow the fish roe to drop by gravity to a collecting receptacle.

5 Claims, 9 Drawing Figures

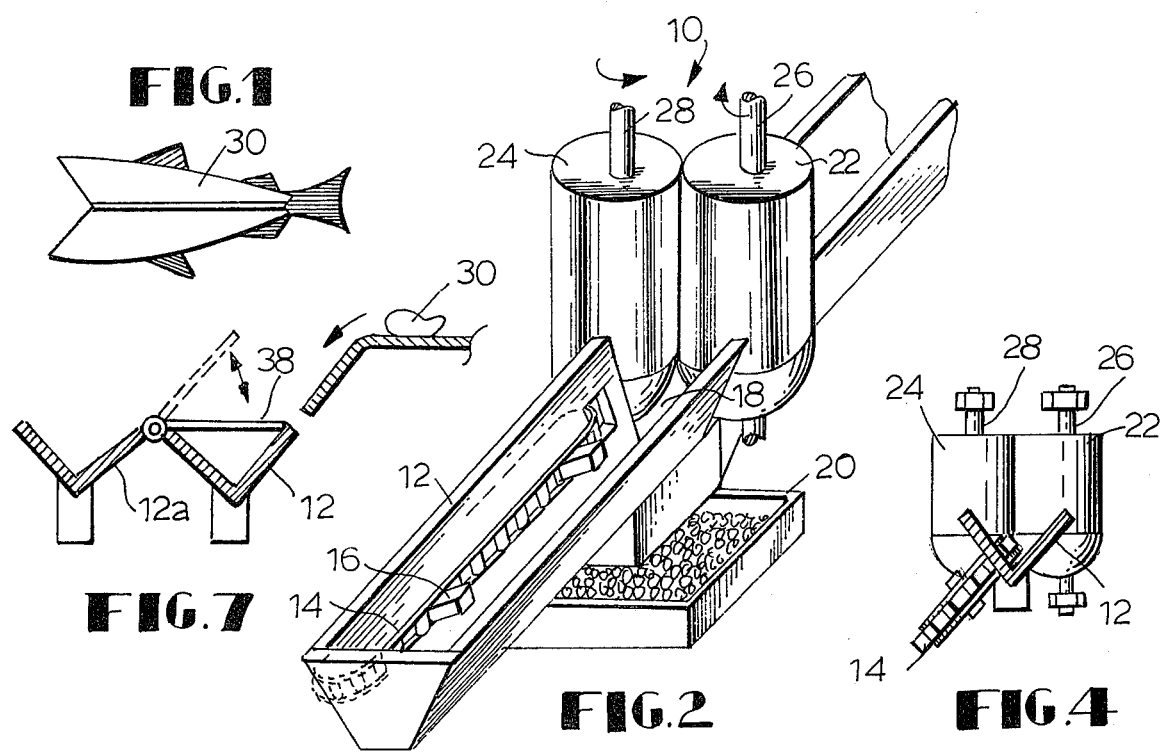
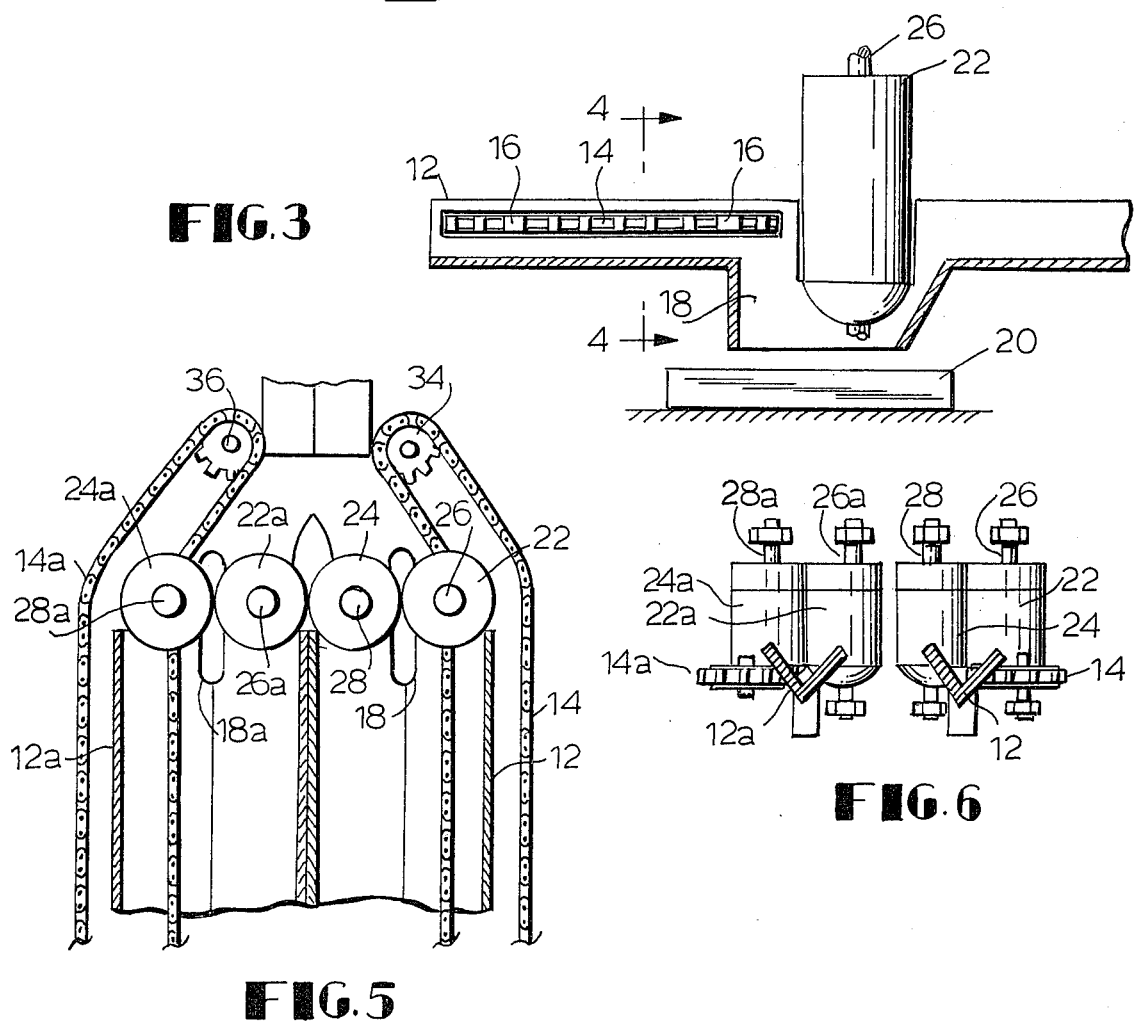

APPARATUS FOR MECHANICALLY EXTRACTING FISH ROE

BACKGROUND OF THE INVENTION

This invention relates to a method and apparatus which may be utilized with other machinery as part of an overall butchering and cleaning operation for fish. Specifically, the invention relates to the mechanical extraction of fish roe in a continuous process that is used as part of the overall fish cleaning operation. Thus the invention is directed to one stage of the operation concerned solely with the extraction of the fish roe. It is envisioned that the device could be used with a butchering and cleaning machine presently used in the salmon industry.

The prior art discloses devices which provide for roe extraction mechanically. Several drawbacks to the devices shown in the prior art however exist. For example, U.S. Pat. No. 3,925,846 to Leander discloses a roe removal method and apparatus which requires a slicing device for slicing open the belly of the roe bearing fish and, in conjunction therewith, a protective device to ensure that the roe sacks themselves are not cut while the fish belly is being sliced open. Another drawback to the Leander device and method is that each fish is treated in stop and go stages, which reduces the speed of operation of the device.

The present invention saves space by eliminating the slicing of the fish belly, and hence the necessity of protecting the roe from cutting, greatly enhances the speed of operation by providing roe removal in a continuous process, and reduces machinery costs by eliminating previously utilized stages in the roe removal.

SUMMARY OF THE INVENTION

The method employed in the present invention includes the steps of introducing a fish (after head removal) along a V-shaped trough, said fish being disposed in said trough in a tail-first, belly-up posture, moving the fish (tail first) through a pair of vertically-disposed, resilient rollers which are positioned relative to a lower trough opening in front of the rollers such that as the fish body is inwardly received into the rollers and compressed on each side, which gently, but positively forces the fish roe out through the opening formed by the head removal, the roe drops through the lower opening in the trough by gravity to a collecting receptacle. The operation is continuous in that the fish are removed along by an endless chain disposed relative to the trough to allow continuous movement of the fish into the rollers.

The machine to accomplish the invention includes a V-shaped trough, a pair of vertically disposed resilient rollers spaced apart sufficiently to allow the introduction of fish bodies there between, the rollers being rotatably driven by a conventional belt and motor drive system. The fish body transport mechanism includes an endless chain having arms extending from particular links to move each fish along (tail first), serially, in the trough for introduction into the rollers in a continuous fashion. A paddle wheel scraper, shaped to not interfere with the compression rollers, is positioned in front of the rollers to assist in roe removal and collection.

The fish roe, upon experiencing inward compression on each side of the fish body, once out of the opening of the fish body, are dropped by gravity into a collecting receptacle. The paddle wheel scraper brushes the roe downwardly assisting in the transfer.

Thus it is realized that the operation is continuous and completely eliminates the need for slicing the fish belly, while at the same time eliminating any protective means necessary to prevent cutting the fish belly too deeply which could damage the fish roe.

It is an object of this invention to provide an improved mechanical fish roe extracting machine and method.

It is another object of this invention to provide a fish roe extracting machine that eliminates the need for slicing the fish belly prior to or during the removal of the fish roe.

And yet still another object of this invention is to provide a mechanical fish roe extracting apparatus (and method) that saves space, eliminates belly slicing, and is useful in conjunction with conventional fish butchering and cleaning machines to form a station therein.

In accordance with these and other objects which will be apparent hereinafter, the instant invention will now be described with particular reference to the accompanying drawings.

BRIEF DESCRIPTION OF THE DRAWINGS

FIG. 1 is a side view of the fish in proper position with the head removed.

FIG. 2 is a perspective view of the present invention.

FIG. 3 is a side view partially in cross-section of the embodiment of FIG. 2.

FIG. 4 is an end view of the invention.

FIG. 5 is a partial top view of an alternate embodiment of the invention using a pair of troughs.

FIG. 6 is an end view of an alternate embodiment of the invention using a pair of troughs.

FIG. 7 is a front elevational view partially schematic for a feed mechanism for the embodiment of FIG. 5.

DESCRIPTION OF THE PREFERRED EMBODIMENT

Figure 8:
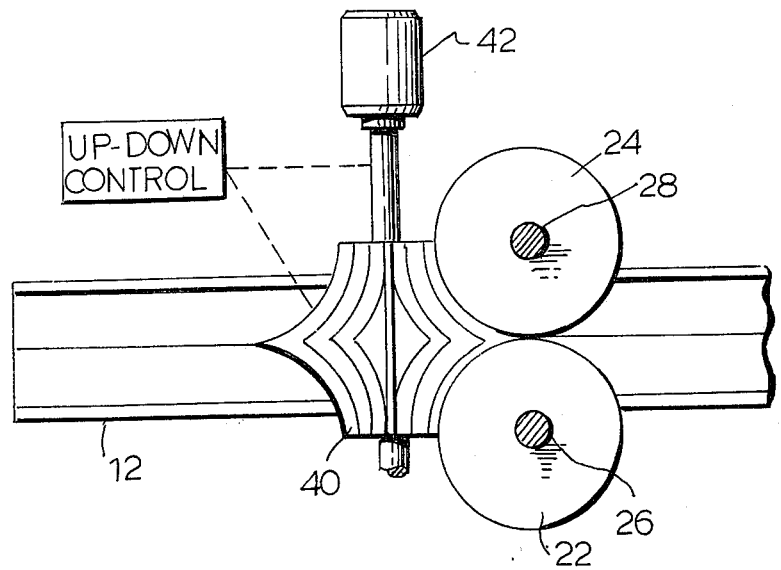
FIG. 8 is a top view of the embodiment of FIG. 2 illustrating a mechanical roe scraper.

Referring to the drawings and more particularly to FIGS. 1, 2, 3 and 4, the apparatus for mechanically extracting fish roe is shown generally at 10. The apparatus 10 comprises a V-shaped trough 12, an endless chain 14 having a plurality of fish engaging lugs 16 disposed therealong, an opening 18 which allows the removed fish roe to fall into the receiving receptacle 20, and a pair of vertically disposed resilient rollers, 22 and 24, spaced apart sufficiently to allow introduction of fish bodies 30 therein along the axis of the vertical plane passing through the center of the V-shaped trough 12, the rollers 22 and 24 being driven by any conventional belt motor drive system (not shown) rotating around the vertical axles 26 and 28. The V-shaped trough acts to hold the fish body in an upright atitude for proper entry between rollers 22 and 24. While the chain 14 is continuously moving, each lug 16 contacts a single fish which is directionally positioned tail first in the trough, forcing the fish body between the rollers, extracting the roe through the fish body opening resulting from the head removal. The extracted roe falls by gravity through the opening 18 into a suitable collecting receptacle 20. The vertical compression rollers are fitted into side openings in the trough (FIG. 3) housing for proper spacing relative to the introduction of the fish body and the roe collecting opening. The transport chain 14 is located relative to the trough (FIG. 4) to prevent inteference with the roe during extraction.

Another embodiment of the invention is shown (FIGS. 5, 6, and 7) utilizing two V-troughs, each trough having its own chain 14 and 14a driven by the gears 34 and 36. Additional rollers 22a and 24a operate in the same manner as rollers 22 and 24 as previously explained. As can be seen the fish can be staggered by using the moveable cover plate 38 which allows alternate placement of a fish in each trough. When the cover plate 38 is positioned over the top of V-shaped trough 12, the fish 30 will be received upon the top of the cover plate. The cover plate 38 is then moved (by conventional means such as a solenoid not shown) to its second position, causing the fish 30 to fall by gravity into the trough 12a, for transport along trough 12a by a chain (FIG. 6). While the cover plate 38 is still in the up position, another fish is received into trough 12 from the conveyor. This enables two roe extracting stations to be operated from a single conveyor for increased efficiency.

Figure 9:
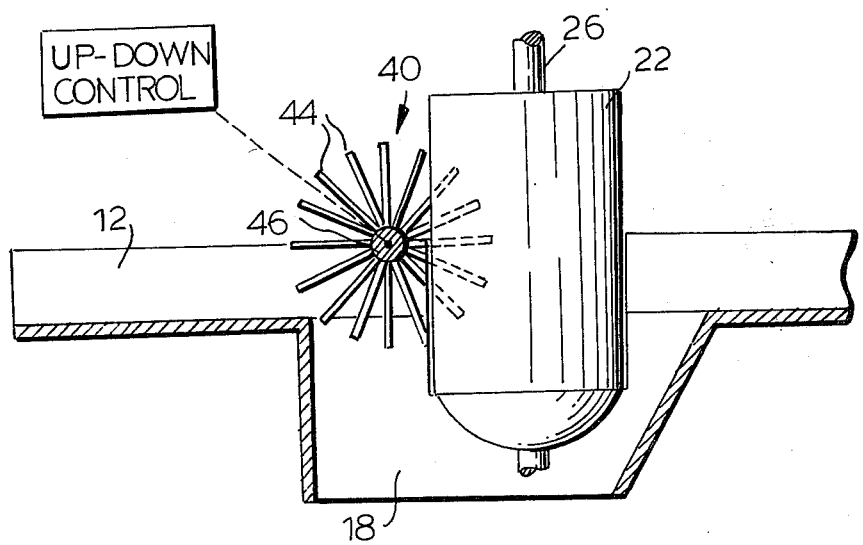
FIG. 9 is a side view of the embodiment of FIG. 2 illustrating a mechanical roe scraper.

A roe scraper (FIGS. 8 and 9) may be added to enhance separation of the roe from the fish body during passage through the rollers. The roe scraper 40 has a plurality of resilient paddles having arcuate edges contoured to fit partially between the rollers 22 and 24 as shown. The scraper is mechanically mounted to a motor 42 that rotates the scraper downwardly relative to the scraper blades closer to the rollers. A reciprocal positioning element (not shown), such as a solenoid, controlled by up-down control 50 causes the scraper to raise and lower its position to allow passage of the fish body into the rollers. The synchronization of the scraper and the fish body position can be accomplished with mechanically actuated microswitches so that the downward movement of the scraper paddles against the body opening is accomplished to wipe away any roe clinging to the opening.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device for removing the roe from a fish after head removal introduced tail-first and belly-up into said device comprising:
    at least one V-shaped trough, each said trough for maintaining the fish in the proper position before extraction of the eggs;
    a compressing means for applying inwardly directed force along a vertical plane on each side of the fish, extracting roe from the head end of the fish as the fish passes through said compressing means, said compressing means connected to each said trough;
    said compressing means includes a pair of driven resilient rollers, each roller rotatable about a vertical axis and in substantially tangential relation;
    said pair of resilient rollers for pressibly contacting each side of the fish fed therebetween to urge the roe out of the fish body opening resulting from said prior head removal;
    each said vertical axis aligned substantially perpendicular to the longitudinal dimension of said trough;
    a feeding means for transporting the fish through said trough, said feeding means operatively connected to said trough;
    each said trough having an aperture adjacent said compressing means for allowing passage of the extracted roe.

2. A device for removing the roe from a fish after head removal as set forth in claim 1 wherein:
    said feeding means includes a driven continuous chain, having a plurality of cams in spaced relation;
    each said cam sized for engaging a fish and pushing the fish through said trough.

3. A device for removing the roe from a fish after head removal as set forth in claim 1, wherein:
    said trough includes a first V-shaped portion and a second V-shaped portion in juxtaposed parallel relation, and a movable member connected between the adjacent sides of said first and second portions;
    said movable member moving alternately between a first position and a second position to allow staggered feeding of the fish into said first trough and said second trough;
    said feeding means includes a first driven continuous chain operably connected to said first trough and a second driven continuous chain operably connected to said second trough;
    said compressing means includes a first pair of driven resilient rollers, operably connected to said first portion and a second pair of driven resilient rollers operably connected to said second portion;
    said first pair of driven resilient rollers, rotatable about a vertical axis and in substantially tangential relation;
    said second pair of resilient driven rollers, rotatable about a vertical axis and in substantially tangential relation;
    each said pair of resilient rollers for pressibly contacting each side of the fish fed therebetween to urge the roe out of the fish body opening resulting from said prior head removal;
    each said pair of vertical axis aligned substantially perpendicular to the longitudinal dimensions of said trough.

4. A device for removing the roe from a fish after head removal as set forth in claim 1, further comprising:
    a scaper means for scraping the roe from the head end of the fish;
    said scraper means includes a paddlewheel;
    said paddlewheel located upstream of said compressing means;
    said paddlewheel being movable along a vertical path to allow passage of the fish to said compressing means, but biased downwardly to scrape the roe from the fish as it passes the paddlewheel;
    said paddlewheel having a plurality of resilient paddles, each said paddle having arcuate edges contoured to fit partially between each said pair of resilient rollers.

5. An improved fish cleaning machine of the type having a head knife for beheading the fish, an indexor where the roe is manually removed from the fish as the fish is conveyed past said indexor, and a V-trough where the fish are fed, tail first with stomach cavity up, into bull wheels which feed the fish into the cleaning portion of said machine, the improvement comprising:
    a mechanical compressing means for applying an inwardly directed force along a vertical plane on each side of the fish whereby the roe is extracted from the head end of the fish, thereby eliminating the need for manual extraction of the roe;

said mechanical compressing means including a pair of resilient rollers, each roller rotatable about a vertical axis and in substantially tangential relation;

each said vertical axis aligned substantially perpendicular to said direction of conveyance of the beheaded fish;

an aperture in said V-shaped trough adjacent said mechanical compressing means for allowing passage of the roe; and a collection container for collecting and holding the roe.

* * * * *